US009836388B1

United States Patent
Moniz et al.

(10) Patent No.: US 9,836,388 B1
(45) Date of Patent: *Dec. 5, 2017

(54) SOFTWARE TESTING ENVIRONMENT THAT INCLUDES A DUPLICATING PROXY SERVICE

(71) Applicant: Amazon Technologies, Inc., Reno, NV (US)

(72) Inventors: Samuel Leonard Moniz, Seattle, WA (US); Kevin Michael Beranek, Seattle, WA (US); Keian Christopher, Seattle, WA (US); Andrew Ross Evenson, Seattle, WA (US); Christopher Keakini Kaulia, Seattle, WA (US); Kyle Bradley Peterson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,619

(22) Filed: Sep. 26, 2013

(51) Int. Cl.
*G06F 11/36* (2006.01)

(52) U.S. Cl.
CPC .................. *G06F 11/3672* (2013.01)

(58) Field of Classification Search
CPC ............ G06F 11/3688; G06F 11/3684; G06F 11/3692; G06F 11/3636
USPC .......................................................... 717/124
See application file for complete search history.

(56) References Cited

U.S. PATENT DOCUMENTS

| 5,630,049 A | 5/1997 | Cardoza et al. |
| 6,205,449 B1 | 3/2001 | Rastogi et al. |
| 6,253,334 B1 | 6/2001 | Amdahl et al. |
| 6,981,180 B1 * | 12/2005 | Bailey et al. ............... 714/38.11 |
| 7,882,496 B2 | 2/2011 | Cognigni et al. |
| 7,891,004 B1 | 2/2011 | Gelvin et al. |
| 7,899,901 B1 | 3/2011 | Njemanze et al. |
| 7,954,090 B1 | 5/2011 | Qureshi et al. |
| 8,001,422 B1 * | 8/2011 | Sun et al. ........................ 714/25 |
| 8,015,549 B2 | 9/2011 | Cooper et al. |
| 8,112,262 B1 * | 2/2012 | Michelsen ...................... 703/13 |
| 8,291,387 B2 | 10/2012 | Pal et al. |
| 8,327,334 B2 | 12/2012 | Chockler et al. |

(Continued)

OTHER PUBLICATIONS

Office Action for U.S. Appl. No. 14/038,583, dated Oct. 10, 2014, Samuel Leonard Moniz, "Duplicating Proxy Service", 43 pages.

(Continued)

*Primary Examiner* — Li B Zhen
*Assistant Examiner* — Daniel Wei
(74) *Attorney, Agent, or Firm* — Lee & Hayes, PLLC

(57) ABSTRACT

The techniques described herein provide software testing of a candidate software system. In some examples, an interceptor intercepts at least one production request to a production software system. The duplicating proxy service causes the at least one intercepted request to be processed by the candidate software system being validated and the production software system being used to validate the candidate software system. The duplicating proxy service may then compare and/or analyze at least one candidate response to the intercepted request from the candidate software system and at least one production response to the intercepted request from the production software system.

20 Claims, 7 Drawing Sheets

(56) References Cited

U.S. PATENT DOCUMENTS

| | | | |
|---|---|---|---|
| 8,448,131 | B2 | 5/2013 | Ottavi et al. |
| 8,539,080 | B1 | 9/2013 | Uluderya et al. |
| 8,826,239 | B2 | 9/2014 | Sawano |
| 8,832,657 | B1 | 9/2014 | Cowan et al. |
| 8,843,910 | B1 | 9/2014 | Schwerin et al. |
| 8,966,464 | B1 | 2/2015 | Christopher et al. |
| 8,990,778 | B1* | 3/2015 | Allocca et al. ............ 717/126 |
| 9,081,899 | B2 | 7/2015 | Ahmed et al. |
| 2003/0217166 | A1 | 11/2003 | Dal Canto et al. |
| 2004/0205695 | A1 | 10/2004 | Fletcher |
| 2005/0257086 | A1* | 11/2005 | Triou et al. .............. 714/25 |
| 2006/0101476 | A1 | 5/2006 | Robert |
| 2006/0129988 | A1 | 6/2006 | Calsyn et al. |
| 2006/0256763 | A1 | 11/2006 | Nguyen et al. |
| 2007/0050686 | A1 | 3/2007 | Keeton et al. |
| 2007/0050768 | A1 | 3/2007 | Brown et al. |
| 2008/0059750 | A1 | 3/2008 | Ogawa |
| 2008/0097995 | A1 | 4/2008 | Dias et al. |
| 2008/0229280 | A1 | 9/2008 | Stienhans |
| 2008/0229284 | A1 | 9/2008 | Castro et al. |
| 2008/0250097 | A1 | 10/2008 | Angelini et al. |
| 2008/0282112 | A1 | 11/2008 | Bailey et al. |
| 2008/0282233 | A1 | 11/2008 | Sheppard |
| 2009/0132999 | A1* | 5/2009 | Reyes ..................... 717/124 |
| 2009/0307533 | A1 | 12/2009 | Niikkonen et al. |
| 2010/0162050 | A1 | 6/2010 | Cathro |
| 2010/0305983 | A1 | 12/2010 | De Marcken |
| 2010/0325616 | A1 | 12/2010 | Singonahalli et al. |
| 2011/0145790 | A1 | 6/2011 | Rajaraman et al. |
| 2011/0145795 | A1 | 6/2011 | Khanapurkar et al. |
| 2011/0161488 | A1 | 6/2011 | Anderson et al. |
| 2011/0173591 | A1 | 7/2011 | Prasad |
| 2011/0222407 | A1 | 9/2011 | Matsuo et al. |
| 2011/0231822 | A1 | 9/2011 | Sabin et al. |
| 2012/0047492 | A1* | 2/2012 | Huang et al. ............. 717/128 |
| 2012/0084433 | A1 | 4/2012 | Bar-Caspi et al. |
| 2012/0084605 | A1 | 4/2012 | Shilon et al. |
| 2012/0084753 | A1 | 4/2012 | Maybee et al. |
| 2012/0159523 | A1 | 6/2012 | Kulkarni et al. |
| 2012/0221513 | A1 | 8/2012 | Papadomanolakis et al. |
| 2012/0290571 | A1 | 11/2012 | Lee et al. |
| 2012/0291014 | A1 | 11/2012 | Shrinivasan |
| 2013/0117609 | A1* | 5/2013 | Dande et al. ............ 714/32 |
| 2013/0124807 | A1 | 5/2013 | Nielsen et al. |
| 2013/0198226 | A1 | 8/2013 | Dhuse et al. |
| 2013/0275877 | A1 | 10/2013 | Varner et al. |
| 2013/0318512 | A1 | 11/2013 | Kuppala et al. |
| 2014/0026122 | A1 | 1/2014 | Markande et al. |
| 2014/0040883 | A1 | 2/2014 | Tompkins |
| 2014/0047140 | A1 | 2/2014 | Otenko et al. |
| 2014/0068567 | A1 | 3/2014 | Smith et al. |
| 2014/0365554 | A1 | 12/2014 | Bleau et al. |
| 2016/0044531 | A1 | 2/2016 | Papa et al. |

OTHER PUBLICATIONS

Office Action for U.S. Appl. No. 14/038,583, dated Mar. 19, 2015, Samuel Leonard Moniz, "Duplicating Proxy Service", 43 pages.
Office action for U.S. Appl. No. 14/038,583, dated Feb. 11, 2016, Moniz et al., "Duplicating Proxy Service", 53 pages.
Office action for U.S. Appl. No. 14/038,583, dated Aug. 27, 2015, Moniz et al., "Duplicating Proxy Service", 51 pages.
Office action for U.S. Appl. No. 14/038,583, dated Jul. 14, 2016, Moniz et al., "Duplicating Proxy Service", 54 pages.
Andrica et al., "WaRR: A Tool for High-Fidelity Web Application Record and Replay", IEEE/IFIP 41st International Conference on Dependable Systems & Networks (DSN), Jun. 2011, pp. 403-410.
Brodovsky, et al.,"A/B Testing at SweetIM: the Importance of Proper Statistical Analysis", 11th IEEE International Conference on Data Mining Workshops, Dec. 2011, pp. 733-740.
Crameri, et al., "Staged Deployment in Mirage, an Integrated Software Upgrade Testing and Distribution System", SOSP'07, SIGOPS Symposium on Operating Systems Principals, Oct. 14-17, 2007, Stevenson, Washington, ACM, pp. 221-236.
Office action for U.S. Appl. No. 14/498,862, dated Jan. 27, 2017, Kulkarni et al., "Software Container Activation and Throttling", 21 pages.
Office action for U.S. Appl. No. 13/797,641, dated Oct. 26, 2016, Allocca et al., "Optimization of Production Systems", 18 pages.
Office action for U.S. Appl. No. 14/498,880, dated Oct. 28, 2015, Beranek et al., "Software Container Activation and Throttling", 19 pages.
Office action for U.S. Appl. No. 14/498,880 dated Feb. 21, 2017, Beranek et al., "Software Container Activation and Throttling", 28 pages.
Office action for U.S. Appl. No. 14/498,862, dated Feb. 26, 2016, Kulkarni et al., "Software Container Activation and Throttling", 48 pages.
Office action for U.S. Appl. No. 14/498,874, dated Feb. 3, 2017, Kulkarni et al., "Software Container Activation and Throttling", 29 pages.
Office action for U.S. Appl. No. 13/797,641, dated Mar. 16, 2016, Allocca et al., "Optimization of Production Systems", 23 pages.
Office action for U.S. Appl. No. 14/641,177, dated Mar. 24, 2016, Allocca et al., "Shadow Test Replay Service", 22 pages.
Office action for U.S. Appl. No. 13/797,641, dated Apr. 25, 2017, Allocca et al., "Optimization of Production Systems", 23 pages.
Office action for U.S. Appl. No. 14/498,880 dated Jun. 6, 2016, Beranek et al., "Software Container Activation and Throttling", 26 pages.
Office action for U.S. Appl. No. 14/641,177, dated Jul. 15, 2016, Allocca et al., "Shadow Test Replay Service", 59 pages.
Office action for U.S. Appl. No. 14/498,862, dated Jul. 15, 2016, Kulkarni et al., "Software Container Activation and Throttling", 38 pages.
Office action for U.S. Appl. No. 14/498,862, dated Jul. 26, 2017, Kulkarni et al., "Software Container Activation and Throttling", 20 pages.
Office action for U.S. Appl. No. 14/641,177 dated Sep. 14, 2015, Allocca et al., "Shadow Test Replay Service", 20 pages.
Office action for U.S. Appl. No. 14/498,874, dated Sep. 23, 2016, Kulkarni et al., "Software Container Activation and Throttling", 23 pages.
Office action for U.S. Appl. No. 13/797,641 dated Sep. 8, 2015, Allocca et al., "Optimization of Production Systems ", 17 pages.
Orso, et al., "Gamma System: Continuous Evolution of Software after Deployment", Proceedings of the 2002 ACM SIGSOFT International Symposium on Software Testing and Analysis, ACM, Jul. 2002, pp. 65-69.
Tsai et al., "A Noninterference Monitoring and Replay Mechanism for Real-Time Software Testing and Debugging," IEEE Transactions on Software Engineering, vol. 16, Issue 8, Aug. 1990, pp. 897-916.
Wang et al., "Real Application Testing with Database Replay," DBTest '09, ACM, Jun. 2009, 6 pages.

* cited by examiner

SOFTWARE TESTING ENVIRONMENT THAT INCLUDES A DUPLICATING PROXY SERVICE

BACKGROUND

Software architects often engage in a process of improving software after deployment of the software. The improvements may be implemented by modifying a software system or by creating a new software system (e.g. a replacement system), where the modified or new software system is intended to replace the deployed (current) software system. Deployment of the modified or the new software system may have an impact on hardware that supports the software system (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test to compare results following execution of the modified or new software system against results following execution of the deployed (current) software system prior to a full deployment of the modified or new software system.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
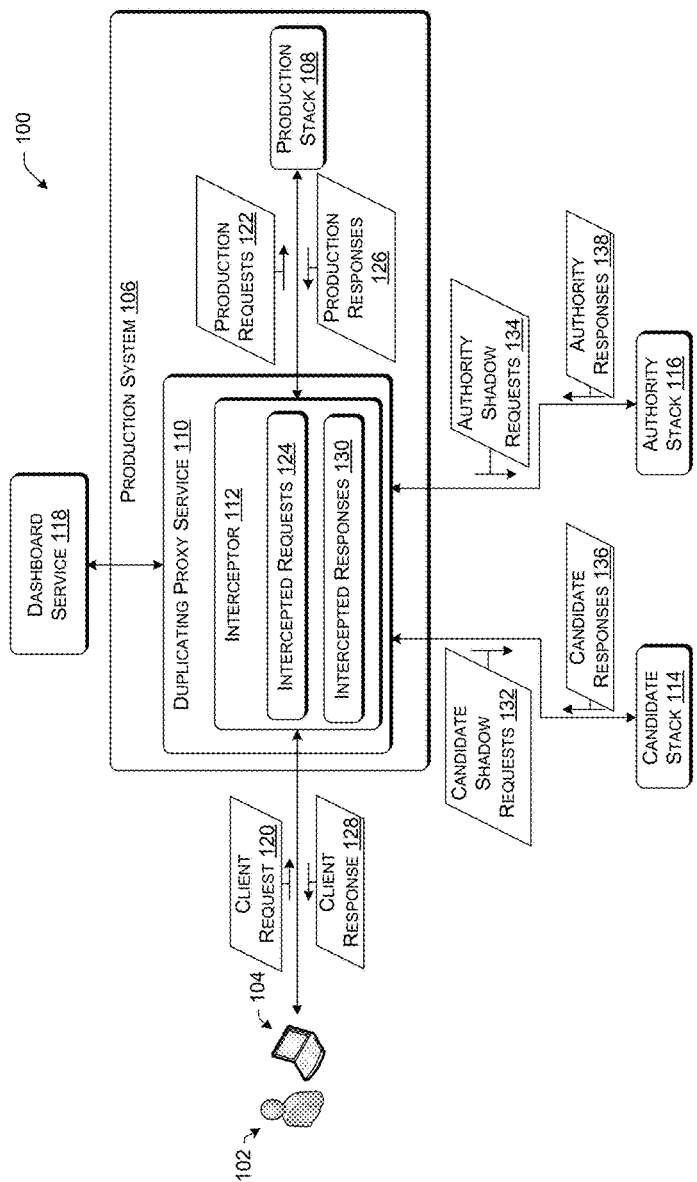
FIG. 1 is a schematic diagram of an illustrative environment that provides software testing of one or more software systems using intercepted requests.

This disclosure is directed in part to software testing that may process a production request using a production (or "live") software system and an intercepted request, which is a duplicate of or is based on the production request. Some implementations may comprise a duplicating proxy service operating a candidate software system that may be a candidate version of the production software system or a similarly functioning software system (e.g., a trial or test version, a replacement software system, a new implementation, etc.). Such a duplicating proxy service may be part of the production system, a separate system, or part of another system. The production software system, unlike the candidate software system, may update production system data and may transmit data back to the end users while the duplicated shadow request handled by the candidate software system does not output to the users and/or affect the production system. In contrast to typical A/B testing, the testing of the candidate software system may occur without updating production system data and thus may be used to test system functionality and performance when executing sample requests that are based on actual client requests (i.e. that were or are processed with the production software system).

In some implementations, an interceptor module of a duplicating proxy service may use sampling rules to intercept client requests and initiate testing based on various factors, rules or logic. Thus, not all client requests may be duplicated and issued as candidate shadow requests. As each client request is received and processed by the duplicating proxy service, the duplicating proxy service system may analyze the result of the candidate software system (such as by comparing the result returned for the candidate shadow request to the result returned for the production request by the production software system). The duplicating proxy service system may then derive metrics and log data about the testing on a request-by-request or aggregate basis. Some or all of the data may then be presented via a dashboard service. The dashboard service may be used to replay one or more intercepted requests for various purposes, such as to replay the request to the candidate software system after a code change or patch has been applied.

As alluded to above, in some implementations, the duplicating proxy service may operate to allow for the above described functions to be performed with respect to different software systems, software implementations, and/or different versions. In other words, in some implementations, the candidate software system is not limited to a new version of a production software system. For example, the "candidate system" of some implementations may be a different implementation of the production system based on a different framework and/or may include a different interface or the like. Additional examples are provided below with respect to FIG. 7.

The techniques and systems described herein may be implemented in a number of ways. Example implementations are provided below with reference to the figures.

FIG. 1 is a schematic diagram of an illustrative environment 100 that provides software testing of one or more candidate software systems using a duplicating proxy service. As shown in FIG. 1, the illustrative environment includes a user 102 operating a user device 104 and a production system 106 operating a production stack 108 and a duplicating proxy service 110. The duplicating proxy service 110 may include an interceptor 112 and interact with and/or operate a candidate stack 114, an authority stack 116 and a dashboard service 118. While shown as stand-alone items, one of ordinary skill in the art would understand that the candidate stack 114 and authority stack may be operated by system resources, such as duplicating proxy service system resources, production system resources or other system resources. These system resources may be computing devices, distributed or non-distributed computing services, server farm(s) or other types of resources that can execute the various software systems. FIG. 1 also illustrates an exemplary duplicating proxy service system which, in the implementation shown in FIG. 1, includes the duplicating proxy service 110 and the dashboard service 118. In some implementations, the duplicating proxy service system may comprise a test framework. In some such implementations, the test framework may be exposed as a web service for external clients.

In operation, the user 102 (e.g., a downstream consumer or user) may, using a user device 104, transmit a client request 120 for electronic data from the production system 106. However, in some implementations, the client request 120 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate various versions of a software system that are executable in a framework and processed by production system resources. The versions may include the version of the software system utilized by the production stack 108 that is currently deployed to fulfill user requests, such as client request 120.

The interceptor 112 of the duplicating proxy service 110 intercepts at least some requests sent to the production system 106, such as the client request 120, and forwards (or publishes) the requests to the production stack 108 as production requests 122. In addition, the interceptor 112 (or another component of the duplicating proxy service) may duplicate the client requests 120 as the intercepted requests 124 for additional processing that is discussed below. The production stack 108 processes the production requests 122 normally using the production version of the software and replies with production responses 126. In the example implementation shown in FIG. 1, the interceptor 112 may act as a relay, receiving the production responses 126 and forwarding the production responses 126 to their respective recipients. For example, the interceptor 112 relays the production response 126 that corresponded to the client request 120 to the user device 104 as a client response 128. In addition, the interceptor 112 may operate to duplicate the production responses 126 as an intercepted response 130 for additional processing by the duplicating proxy service 110. While the example implementation shown in FIG. 1 shows the interceptor 112 operating as a relay in the manner discussed above, this is not limiting and has been done for ease of illustration. In other implementations, the production stack 108 could reply directly without the interceptor 112 acting as relay.

As discussed above, in addition to forwarding production requests 122 to the production stack 108, the interceptor 112 may duplicate the client requests 120 and production responses 126 for use by the duplicating proxy service 110 in testing. To handle testing in general, the duplicating proxy service system may use a protocol for testing with standardized meta-data for requests and responses. For example, regarding the meta-data, the interceptor 112 may extract some basic meta-data about the client request 120, service, and/or realm and store the meta-data for use by the duplicating proxy service 110 along with or as part of the duplicated client request 120. The interceptor 112 may operate so as to allow the requests to be intercepted in an asynchronous, non-blocking manner to minimize the potential for disruption of the production system 106 due to, for example, failures in the duplicating proxy service system (such as a failure of the interceptor 112). Similar interception and meta-data extraction operations may be performed for responses (such as production response 126). In some implementations, the interception of requests and responses for the duplicating proxy service 110 may be configurable, such as on a per API level. Some configurable parameters may include a publishing percentage, a sampling methodology, etc. Further, the interceptor 112 may operate based on multiple sets of interception rules, scenarios, tests, etc. For example, in some implementations, the interceptor 112 may be configured to intercept and duplicate a first percentage (e.g., 50%) of an indicated first type of client request 120 (e.g., product search, purchase order, etc.) and to intercept and duplicate a second percentage (e.g., 40%) of an indicated second type of client request 120. Further, the interceptor 112 may be configured to cap the intercepted requests. For example, the interceptor 112 may be configured to cap the interception of the first type of client request 120 at five (5) client requests 120 per second and the interception of the second type of client request 120 that eight (8) client requests 120 per second. In another example, the interceptor 112 may be configured to intercept an indicated percentage of all client requests 120 with a cap of twenty-five (25) requests per second. Moreover, these are merely examples of the configuration of the interceptor 112 and implementations may include any combination of these and/or other configurable parameters.

The duplicating proxy service 110 processes the intercepted requests 124. Depending on the processing desired, the duplicating proxy service 110 operates to replay the intercepted requests 124 to one or more of the production stack 108, candidate stack 114 and the authority stack 116. This is illustrated in FIG. 1 as candidate shadow requests 132 and authority shadow requests 134, respectively. Herein, two processing scenarios are set forth as non-limiting examples.

In a first processing scenario, the duplicating proxy service 110 replays the intercepted request 124 to the candidate stack 114 and to the authority stack 116 as a candidate shadow request 132 and an authority shadow request 134. The duplicating proxy service 110 utilizes the resulting candidate response 136 and authority response 138 in testing the software system operated by the candidate stack 114.

In a second processing scenario, the duplicating proxy service 110 replays the intercepted request 124 to the candidate stack 114 and the interceptor 112 of the duplicating proxy service 110 intercepts the production response 126 as an intercepted response 130. The candidate response 136 and intercepted response 130 are then used in testing the candidate software system operated by the candidate stack 114.

As mentioned above, the candidate stack 114 is a stack operating a candidate software system which is to be validated, such as an altered application stack or software system that is to be validated or a new software system or implementation of the software system being adopted for the production system. The authority stack 116 is a stack operating a software system which may be used for validating the software system operated by the candidate stack 114 in some types of testing.

For example, in some implementations, the authority stack 116 may be a most recent version of a software system of the production system known to have acceptable functionality and performance. In some implementations, the software system operated by the authority stack 116 may be a mirror copy of software system of the production stack 108 operated by the production system 106. In some implementations, the production stack 108 may be operated to perform the functions of the authority stack 116. In such a case, the authority shadow requests 134 may be sent to the production system 106 by the duplicating proxy service 110 and may be tagged such that the production stack 108 knows the authority shadow request 134 is a shadow request and should be returned to the duplicating proxy service 110 instead of the user device 104 and that the processing of the authority shadow request 134 should not result in changes in production system data used to perform production requests 122.

In some implementations, the duplicating proxy service 110 operates to dynamically modify at least some of the parameters of the duplicated client requests 120 before replaying the client requests as shadow requests to the candidate stack 114 and authority stack 116. In such an implementation, the duplicating proxy service 110 may preserve the integrity of the modified shadow requests, apart from the intended modifications, to faithfully replay the shadow requests.

In operation, the candidate stack 114 and authority stack 116 each receive the candidate shadow requests 132 and authority shadow requests 134, respectively, from the duplicating proxy service 110 and process the received requests according to its respective software system. Unlike the processing performed by the production system 106 for the production request 120, the processing at the candidate stack 114 and authority stack 116 may not be revealed or reported to the user and/or does not modify data used by the production system 106. Thus, any outputs and/or manipulations of data from the candidate stack 114 and authority stack 116 may not be seen by the user and/or used to generate data that is later output to the user. Instead, the processing by the candidate stack 114 and authority stack 116 is used to test execution of the software system operated by the candidate stack 114. Upon completion of the processing of each of the candidate shadow requests 132 or authority shadow requests 134, the candidate stack 114 and authority stack 116 send a candidate response 136 or authority response 138 to the duplicating proxy service 110, respectively. While FIG. 1 shows the candidate stack 114 and authority stack 116 as operating separately as independent entities, implementations are not so limited. Rather, in various implementations, the operations of the candidate stack 114 and authority stack 116 may be performed in parallel, sequentially, or at other times by the same or different computing devices of the shadow proxy service system or another system.

Upon receiving a candidate response 136 and a corresponding intercepted response 130 or a corresponding authority response 138, the duplicating proxy service 110 may compare the fields contained in the candidate response 136 and the intercepted response 130 or the authority response 138 along with other information such as latency data or other performance metrics and logs the results. The results of the comparison and the logs are then available for use by the components of the duplicating proxy service 110 and dashboard service 118, as will be discussed in more detail below with respect to FIGS. 2 and 3.

As mentioned above, in the second example processing scenario, an intercepted response 130 and any meta-data extracted regarding the intercepted response 130 may be utilized instead of the authority stack 116 in a similar manner to that discussed below with respect to FIGS. 2 and 3.

Illustrative Computing Architecture

Figure 2:
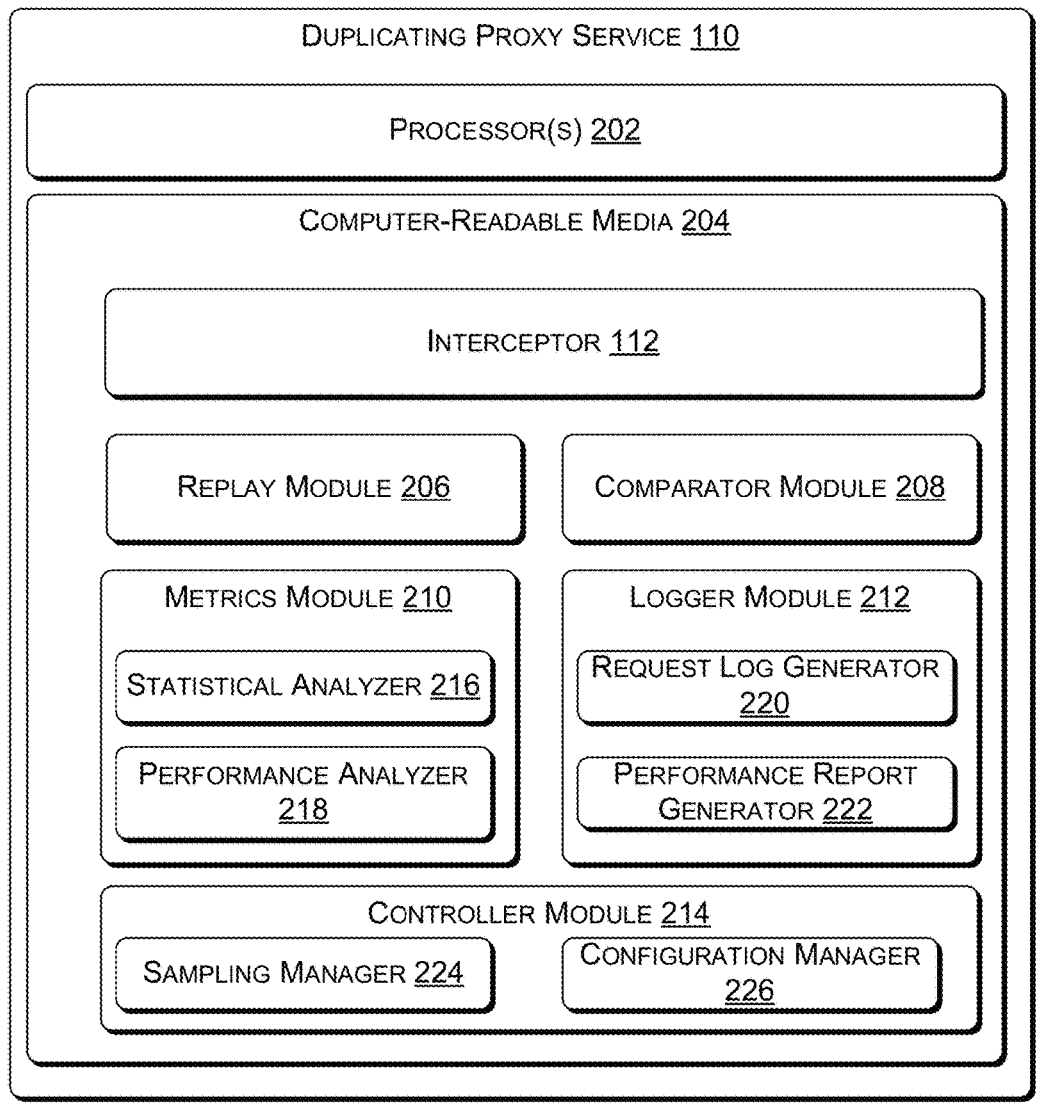
FIG. 2 is a schematic diagram of an illustrative computing architecture to provide a duplicating proxy service for software testing of one or more software systems using intercepted requests.

FIG. 2 is a schematic diagram of an illustrative computing architecture 200 of an example duplicating proxy service 110 that provides for software testing of one or more software systems duplicated (or shadow) requests. The computing architecture 200 may be implemented in a distributed or non-distributed computing environment.

The computing architecture 200 may include one or more processor(s) 202 and computer readable media 204 that store various modules, applications, programs, or other data. The processor(s) 202 may be a single processing unit or a number of processing units, all of which may include single or multiple computing units or multiple cores. The processor(s) 202 can be implemented as one or more hardware processors such as microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the computer-readable media 204, a mass storage device, or other computer-readable media. The computer-readable media 204 may include instructions that, when executed by the one or more processors 202, cause the processors to perform the operations described herein for the duplicating proxy service 110. In some embodiments, the computer-readable media 204 may store the interceptor 112, a replay module 206, a comparator module 208, a metrics module 210 and associated components, a logger module 212 and associated components, and a controller module 214 and associated components, which are described in turn. The components may be stored together or in a distributed arrangement.

The replay module 206 may operate to replay the intercepted requests 124 to the candidate stack 114 and, in at least some cases, the authority stack 116. In the following discussion, it should be understood that the authority stack 116 may not be utilized by the duplicating proxy service 110 for all operations (e.g. in operations in which intercepted responses 130 are utilized). Thus, simultaneous discussion of the operations of the candidate stack and authority stack is for convenience and not limitation.

In summary, in some implementations, the replay module 206 operates to impersonate the entity making the request and interacts with the candidate stack 114 and authority stack 116 in accordance with this role. In some implementations, the replay module 206 operates to dynamically modify at least some of the parameters of the intercepted requests 124 before replaying the requests to the candidate stack 114 and authority stack 116 as the candidate shadow requests 132 and authority shadow requests 134. For example, the replay module 206 may modify candidate shadow requests 132 to the candidate stack 114 to simulate specific behavior for test purposes. In such an implementation, the replay module 206 may preserve the integrity of the modified shadow request, apart from the intended modifications, to faithfully replay the shadow request.

As mentioned above, in some implementations, the candidate stack 114 may operate a candidate software system which is a different implementation of the software system operated by the production or authority stacks (e.g., an implementation utilizing a different framework or interface to similar core logic). The candidate stack 114 may also operate a candidate software system which is an entirely different software system to that operated by the production or authority stacks. In these and similar scenarios, the replay module 206 may operate to modify the intercepted requests 124 to match a specification of the candidate software system operated by candidate stack 114.

Upon receiving the candidate response 136 and authority response 138 corresponding to a particular intercepted request 124, the replay module 206 may extract meta-data for the responses and publish the responses and meta-data to the comparator module 208. Some examples of meta-data that may be extracted include information that may be used to derive latency data or other performance metrics.

Similarly, in operations in which intercepted responses 130 are utilized in validating the software system operated by the candidate stack 114, the interceptor 112 may extract meta-data for the intercepted response 130 and publish the intercepted response 130 and meta-data to the comparator module 208. Except where explicitly noted otherwise, with regard to the remaining discussion of FIG. 2, authority responses 138 and intercepted responses 130 will be discussed as authority responses 138 due to the similar treatment of the responses by the comparator module 208, metrics module 210, logger module 212, and controller module 214. Still, as would be recognized by one of ordinary skill in the art, the treatment of the authority responses 138 and intercepted responses 130 may differ in some implementations.

The comparator module 208 may receive the candidate response 136 and authority response 138 and, with regard to each candidate/authority pair, compares the response 136 to the response 138. In some implementations, the comparator module 208 tags and/or classifies at least some of the differences that are ascertained between the responses. For example, the comparator may tag or classify differences which are specified to be important or unacceptable to the functioning of the software system. In some implementations, extensible modeling language based definitions may be used to define the comparison and replay by the duplicating proxy service 112 based on a standardized format. Using such definitions, the comparator module 208 may allow differences based on planned functionality changes in the candidate stack 114 to be suppressed (e.g. ignored). Of course, in some implementations, such suppression of differences based on planned functionality changes in the candidate stack 114 may be implemented at a variety of levels and/or other modules rather than by the comparator module 208. The results of the comparison module 208 are provided to the metrics module 210 and the logger module 212.

It should be noted that the differences that are compared are not limited to any particular type of differences. For example, the differences that are tagged may also include processing differences. An example of a processing difference is a difference in the processing of the request which may not change the result of the request or result in a latency difference in the response but which causes non-critical error messages or issues unnecessary or superfluous internal requests and may represent an additional processing burden on another system or process. A large number of such processing differences may cause other services or systems to become overwhelmed without an apparent difference in the timing or content of the response to the request.

The metrics module 210 may generate metrics from the results of the processing by the candidate stack 114 and the authority stack 116 that were provided by the comparator module 208. The statistical analyzer 216 may determine a trend in the number of differences identified by the comparator module 208 to be unacceptable, determine the number of unacceptable differences identified, capture the trend and/or cause an alarm to be sent to the dashboard service 118. The statistical analyzer 216 may determine positive or negative trends for the candidate software system operated by the candidate stack 114. For example, the statistical analyzer 216 may determine that a particular client request is indicative of or correlated with a particular outcome (either good or bad). The statistical analyzer 216 may then indicate or record the trend to enable the dashboard service 118 to report the trend and allow for appropriate action to be taken, if necessary. The statistical analyzer 216 may also use confidence levels when determining the trends. The performance analyzer 218 may determine or measure performance trends based on performance of each of the candidate stack and the authority/production stack. The performance analyzer 218 may determine how the system resources are responding to use of the different versions or software systems, include processing of spikes in activity, response time, memory allocation, throughput, bandwidth, or other system performance measurement attributes. The system performance may be analyzed using business metrics, system level metrics (e.g., memory, processor, etc.), and/or application level metrics (e.g., bugs, errors, diff count, etc.). For example, the performance analyzer 218 may provide statistics on latency differences between the candidate software system of the candidate stack 114 and the authority software system of the authority stack 116. The metrics module 210 or the comparator module 208 may also determine when a candidate software system operated by the candidate stack 114 includes a bug or other error. Further, in some embodiments, the results of the metrics module 210 and/or the comparator module 208 may be used to identify a failing service in a cascading sequence of service calls where the failing service is a downstream service that is causing difference in all of one or more upstream services. The results of the statistical analyzer 216 and performance analyzer 218 may be output at least to the logger module 212.

The logger module 212 shown in FIG. 2 may comprise at least two components, a request log generator 220 and a performance report generator 222. The request log generator 220 logs data related to the intercepted requests 124, candidate shadow requests 132 and authority shadow requests 134 which have been processed by the production stack 108, candidate stack 114, authority stack 116, replay module 206, comparator module 208 and/or metrics module 210. The request log generator 220 may log all data relating the intercepted requests 124 or some appropriate subset, depending on the particular implementation and configuration settings. In some implementations, the request log generator 220 may store the requests, responses and differences in distributed computing-based storage, with indexed fields for searching. The performance report generator 222 may generate a performance report, which may be based at least in part on an output of the performance analyzer 218.

As mentioned above, many operations of the replay module 206, the comparator module 208, the metrics module 210 and the logger module 212, as well as the interceptor 112, are configurable. In the implementation shown in FIG. 2, the configuration settings are controlled at least in part by a controller module 214. In particular, a sampling manager 224 of the controller module 214 controls aspects of the interceptor 112, and the duplicating proxy service 110 in general, relating to determining which of the client requests 120 are to be intercepted and processed as the intercepted requests 124, which of the intercepted requests 124 are actually processed by the duplicating proxy service 110 as described above, and so on. The sampling manager 224 refers to the configuration manager 226 which interacts with the various systems and users (such as the dashboard service 118) to obtain the configuration settings for the duplicating proxy service 110. Each of the interceptor 112, replay module 206, the comparator module 208, metrics module 210, and logger module 212 may refer to the configuration manager 226 to obtain configuration information or the configuration manager 226 may directly configure the other modules. One example operation performed by the sampling manager 224 may be to receive a predetermined confidence level and then calculate the number of samples (intercepted requests) necessary to achieve the predetermined confidence level. Such a confidence level may be determined based on various factors such as a number of unacceptable differences per a number of intercepted requests, a requirement that some measurement of code paths have been exercised or a mix of use cases to be covered during the testing. In addition to the configurability discussed above, the duplicating proxy service system of some implementations may allow for pluggable modules based on a standardized interface. Such implementations may allow for custom modules which adhere to the standardized interface to be plugged into the duplicating proxy service system in place of the default modules (e.g. a custom comparator module 208 and custom metrics module 210 in place of the default modules).

Figure 3:
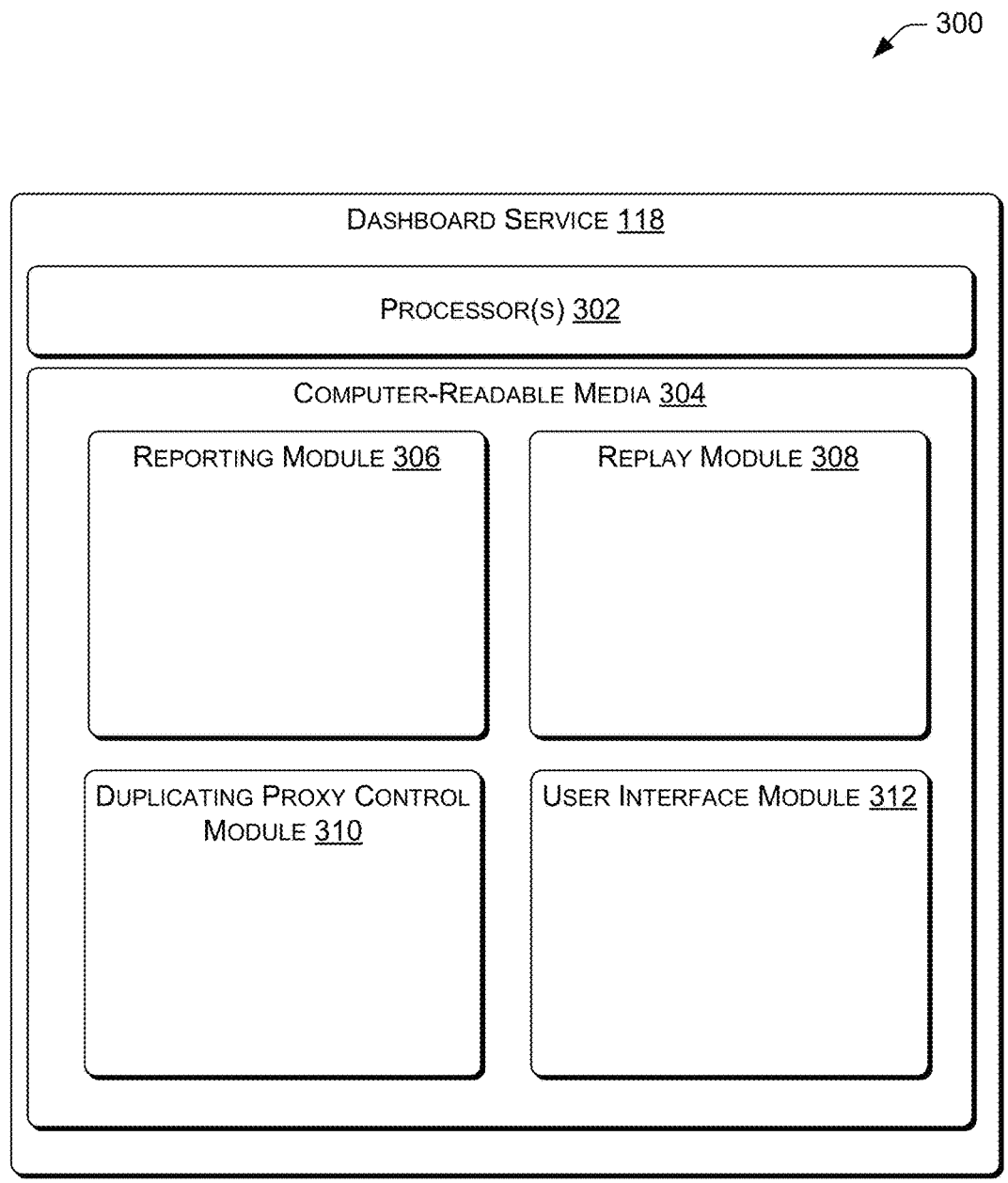
FIG. 3 is a schematic diagram of an illustrative computing architecture to provide a dashboard service for software testing of one or more software systems using intercepted requests.

FIG. 3 is a schematic diagram of an illustrative computing architecture 300 of an example dashboard service 118 that provides interaction with and/or control of the duplicating proxy service 110. The computing architecture 300 may be implemented in a distributed or non-distributed computing environment.

Similar to the computing architecture 200, the computing architecture 300 may include one or more processors 302 and computer readable media 304 that stores various modules, applications, programs, or other data. The computer-readable media 304 may include instructions that, when executed by the one or more processors 302, cause the processors to perform the operations described herein for the dashboard service 118. In some embodiments, the computer-readable media 304 may store a reporting module 306, a replay module 308, a duplicating proxy control module 310 and a user interface module 312, which are described in turn. The components may be stored together or in a distributed arrangement.

As with the discussion of FIG. 2 above, except where explicitly noted otherwise, with regard to the discussion of FIG. 3, authority responses 138 and intercepted responses 130 will be discussed as authority responses 138 due to the similar treatment of the responses by the components of the dashboard service 118 in the illustrated implementation. However, the treatment of the authority responses 138 and intercepted responses 130 may differ in some implementations.

As mentioned above, the dashboard service 118 provides for interaction with and/or control of the duplicating proxy service 110. In some implementations, the dashboard service 118 provides the interaction and/or control, in at least two regards. First, the dashboard service 118 collects and parses the results logged by the logger module 212, providing users of the dashboard service 118 with this information. Second, the dashboard service 118 interacts with the controller module 214 to configure the duplicating proxy service 110 (e.g. configure the interceptor 112) and/or to setup and request replay of one or more intercepted requests 124, such as a set of the intercepted requests 124 represented in the logs generated by the request log generator 220 or the intercepted requests 124 as received from the interceptor 112. To select the one or more logged or stored intercepted requests 124 to be replayed, the dashboard service may provide search and display capability for stored requests and differences.

For example, subsequent to a change in the candidate stack 114, the dashboard service 118 may request that the duplicating proxy service 110 replay the intercepted requests 124 that resulted in unacceptable differences between the candidate responses 136 and authority/production responses 138 to a new/altered/different candidate stack 114, and in some implementations, to the authority stack 116 as well. Once the intercepted requests 124 have been replayed to the new/altered/different candidate stack 114, either the duplicating proxy service 110 or the dashboard service 118 makes a comparison between the new responses and the original responses to determine if the unacceptable differences have been resolved. The general purpose of modules 306-312 in the example implementation shown in FIG. 3 is discussed below, followed by a discussion of the example operations performed by, or caused to be performed by, these modules.

The reporting module 306 may operate to collect or receive the data generated by the logger module 212 and any other data, and prepare the data for presentation to a user via the user interface module 312. For example, the reporting module 306 may collect the trend data generated by the metrics module 210 and prepare this data for presentation in a graph.

The replay module 308 may operate in the manner discussed above to cause one or more of the logged intercepted requests 124 to be replayed. In some implementations, this is performed by requesting that the duplicating proxy service 110 replay the intercepted requests 124 with any desired changes in the setup. Though not illustrated in the figures, in some implementations, the replay module 308 may include a copy of the candidate stack 114, the authority stack 116, and/or a new/altered/different candidate stack or the replay module 308 may interact directly with the software system of one or more of these stacks or the production stack 108. In such an implementation, the replay module 308 may replay the intercepted requests 124 directly to the appropriate software system and/or make the appropriate analysis of the results. As discussed above, one example reason for replaying the intercepted requests 124 would be to determine if a changed candidate software system has reduced, eliminated, or exacerbated any unacceptable differences between the candidate response 136 and authority responses 138. The results of the replay of the intercepted requests 124 would be passed, for example, to the reporting module 306 for preparation for presentation to the user via user interface module 312 (possibly after being analyzed by the comparator module 208, the metrics module 210, the logger module 212, and/or other similar modules).

The duplicating proxy control module 310 may operate to allow for configuration and/or control of the duplicating proxy service 110 by, for example, a user of the dashboard service 118 interacting with the dashboard service 118 through the user interface module 312. An example control that may be performed by the control module 310 would be to configure comparator module 208 to tag differences in specific fields for audit and display purposes rather than all fields. Another example control that may be performed by the control module 310 would be to configure the intercept parameters of the interceptor 112 (e.g., the percentage of client requests to intercept, the maximum number of client requests to be intercepted in a given time period, types of client requests to intercept, etc.) As indicated above, the user interface module 312 of the dashboard service 118 may present a user interface to dashboard service users to allow for interaction by the dashboard user with the duplicating proxy service system.

The dashboard service 118 discussed above may be used to control the duplicating proxy service 110 in various ways such as those discussed below.

As alluded to previously, through interaction with the dashboard service 118, a dashboard user is able to configure the duration of the testing, such as by configuring conditions upon which the interceptor 112 stops intercepting requests to the production system 106. Some types of conditions are described below.

One example condition for controlling the duration of the testing is a specified mix of use cases represented by the intercepted requests 124, such as a number m of first use case requests, a number n of second use case requests, and so on. Use cases of particular intercepted requests 124 could be determined by the tagging and/or classifying function of the comparator module 208 discussed above. In addition to using the mix of use cases to drive the duration of the testing, the dashboard service 118 could use the determined use cases to provide information on the distribution of use cases to the dashboard users via the reporting module 306 and user interface module 312. In some implementations, the use case reporting may be updated on a real-time basis as intercepted requests 124 are received by the duplicating proxy service 110 and processed. Such use case information could be presented in a textual manner or as a visualization (such as a chart) for ease of comprehension. Of course, the determination of use cases and subsequent presentation of the distribution of the use cases represented by the intercepted requests 124 that have been processed may also be performed without the use of this information to control the duration of the testing.

Another example condition for controlling the duration of the testing is a measure of code coverage. For example, the duplicating proxy service system could be configured to continue the testing until a defined percentage or other measurement of the code of the candidate stack 114 has been tested to a satisfactory degree. One example implementation to determine code coverage of an intercepted request would be to instrument code of the candidate stack 114 to be tested such that when a portion of the code is executed, it outputs an indication of its execution. Such instrumenting could be coded into the source code of the candidate software system but selectively compiled based on a flag during the compilation process. Thus, when a candidate software system is to be generated by the compiler for testing, the flag would be set and the code coverage instrumentation code would be compiled into the candidate software system. When the candidate software system is to be used as a production software system, the flag would not be set and the compiler would ignore the code coverage instrumentation code.

Further, the duplicating proxy service system described herein may also be integrated with a source code control system of the software system being tested to allow for identification of code changes that resulted in deviance from expected results and/or to identify the code paths which map to the differences in responses between the candidate stack 114 and the authority stack 116. Integration with the source code control system may also allow the duplicating proxy service system to include an automatic source code rollback function for the candidate software system of the candidate stack 114. For example, based on threshold of response differences or latency increases, the dashboard service, either through program logic or explicit use instruction, could instruct the source code control system to rollback changes to the source code of the candidate software system being tested. In addition to using the code coverage to drive the duration of the testing, the dashboard service 118 could use the determined code coverage to provide information on the code coverage to dashboard users via the reporting module 306 and the user interface module 312. As with the use case reporting, in some implementations, the code coverage reporting may be updated on a real-time basis as client requests 120 are received by the duplicating proxy service 110 and processed. Such code coverage information could be presented in a textual manner or as a visualization (such as a chart or graph) for ease of comprehension. Of course, the determination of code coverage and subsequent presentation thereof may be performed without the use of this information to control the duration of the testing.

In addition, the dashboard service 118 may provide a dashboard user with a user interface (e.g. via the user interface module 312) to cause the duplicating proxy control module 310 to configure the duplicating proxy service 110, the candidate stack 114 and the authority stack 116 for a given test. For example, prior to executing a given test, the user may be able to configure the software systems, software versions, end points, fleets, and the like to be used for the candidate stack 114 and/or authority stack 116.

In a first particular example, the dashboard user may utilize the dashboard service 118 to select system resources to operate one or more of the candidate stack 114, the authority stack 116, the interceptor 112 or other aspects of the system (e.g., one or more machines of a fleet of machines, one or more distributed computing resources available for provisioning, etc.). The dashboard user may then utilize the dashboard service 118 to select the software systems, software versions, end points, fleets, and the like to be used for the candidate stack 114 and/or authority stack 116. Once system resources are selected and system parameters are input, the dashboard user may cause the dashboard service 118 to control the startup of the candidate stack, the authority stack and/or other aspects of the duplicating proxy service 110 based on the parameters selected by the dashboard user. In an example startup of the candidate stack 114, the user may select one or more machines included in available system resources, choose a particular candidate software system, and cause the selected machines to be provisioned with the candidate software system (i.e., install the candidate software system on the machines and perform any other setup process(es) needed to provision the selected machines).

In a second particular example, the dashboard user may utilize the dashboard service 118 in the same manner to select the parameters for the duplicating proxy service except that the user may select system resources already provisioned with the software systems and the like to be utilized. In such a case, the user may be provided with user interface controls to select any endpoint that matches the parameters of the software systems indicated.

While the above discussion includes particular examples of controls that may be provided to the dashboard user by the dashboard service 118, implementations are not so limited and such details may vary from implementation to implementation. For example, in some implementations, the user may be provided with a combination of the particular examples of selecting parameters for the duplicating proxy service. More particularly, in some implementations, the dashboard service 118 may provide functionality to select either or both pre-provisioned and unprovisioned system resources for utilization by the duplicating proxy system 110. These and other variations would be apparent to one of ordinary skill in the art in view of this disclosure.

Illustrative Operation

Figure 4:
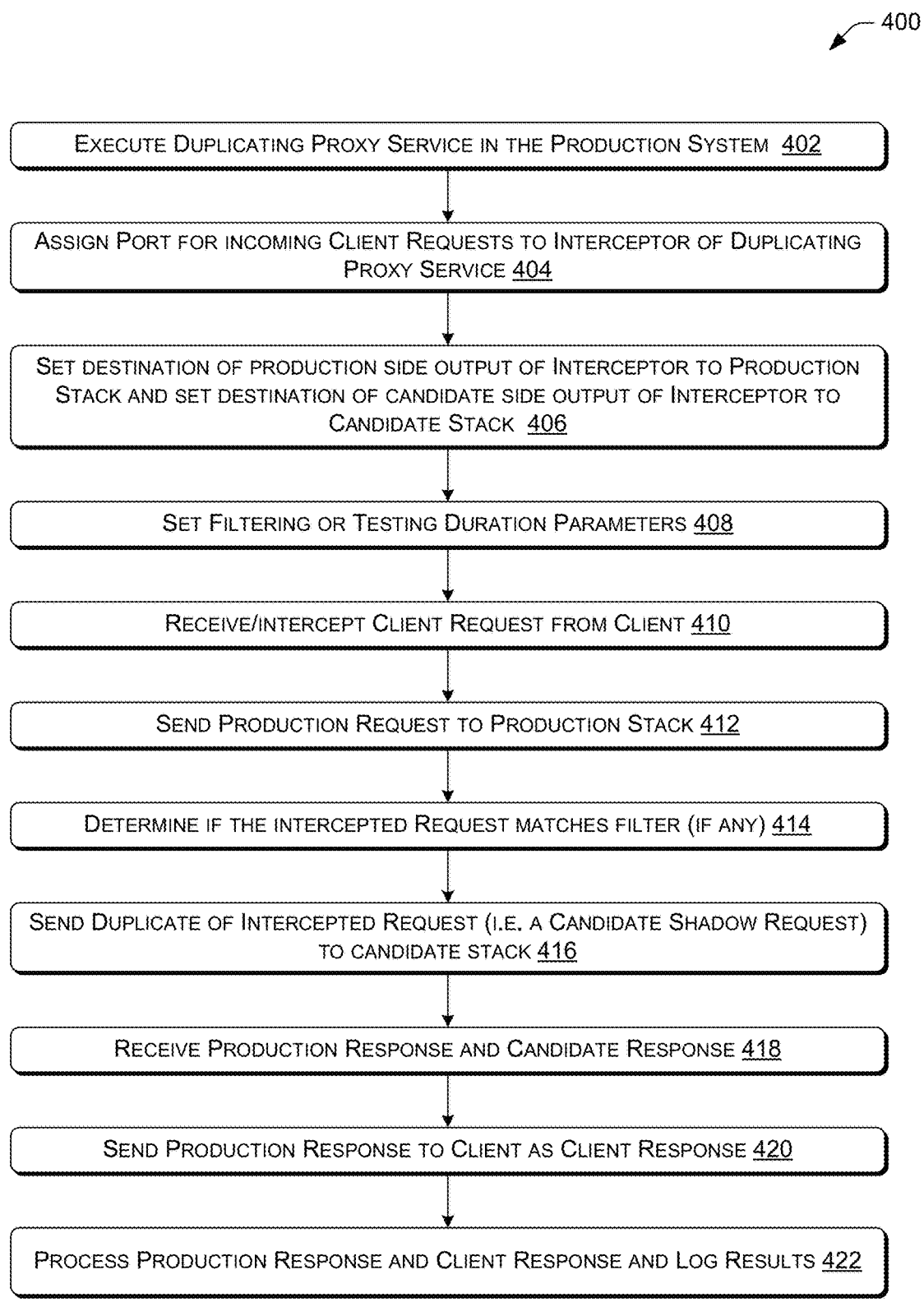
FIG. 4 is a flow diagram of an illustrative process to perform testing of an intercepted request to validate one or more software systems.

FIG. 4 is a flow diagram of an illustrative process 400 that provides for software testing of one or more software systems using intercepted requests as described above regarding FIGS. 1-3. Process 400 may be performed by the duplicating proxy service 110 in conjunction with the production stack 108, candidate stack, and the dashboard service 118. Of course, the process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media (e.g., machine readable storage media) that, when executed by one or more hardware processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download. The order in which the operations are described is not intended to be construed as a limitation, and any number of the described blocks can be combined in any order and/or in parallel to implement the process. Other processes described throughout this disclosure (e.g. FIGS. 5-6), in addition to process 400, shall be interpreted accordingly.

At 402, the production system 106 may execute or begin operation of the duplicating proxy service 110 on one or more machines of the production system. At 404, the duplicating proxy service 110 may operate to assign the address and/or port for incoming client requests to the interceptor 112 of the duplicating proxy service 110. By doing so, client requests 120 received by the production system 106 on machines operating the duplicating proxy service 110 will be directed to the interceptor (as opposed to the production stack 108).

At 406, the duplicating proxy service 110 may set the destination of a production side output of the interceptor 112 to the address and port of the production stack 108. Similarly, the duplicating proxy service 110 may set the destination of a candidate side output of the interceptor 112 to the address and port of the candidate stack 114. By doing so, the interceptor 112 is set to forward client requests 120 to the production stack 108 as production requests 122 and, for at least some client requests 120, forward client requests 120 to the candidate stack 114 as candidate shadow requests 132.

At 408, the duplicating proxy service 110 may set filtering or testing duration parameters. This may be done in the manner discussed above with regard to the sampling manager 224.

At 410, the production system 106 may receive a client request 120 from a client. At 412, the interceptor 112 intercepts the received client request 120 and sends the client request 120 to the production stack as a production request 122. At 414, the interceptor 112 may determine if the intercepted request 124 matches the filter parameters for sampling of intercepted requests 124, if any.

At 416, for an intercepted request that matches the filter, the interceptor 112 may send a duplicate of the intercepted request (i.e. a candidate shadow request 132) to the candidate stack 114.

At 418, the interceptor 112 may receive a production response 126 and candidate response 136 corresponding to be intercepted request 124. At 420, the interceptor 112 may forward the production response 128 to the corresponding client as a client response 128 and store a duplicate of the production response 126 as an intercepted response 130 along with the candidate response 136.

At 422, the duplicating proxy service 110 may operate to process the intercepted response 130 and candidate response 136 and log the results of the processing in the manner discussed above.

Figure 5:
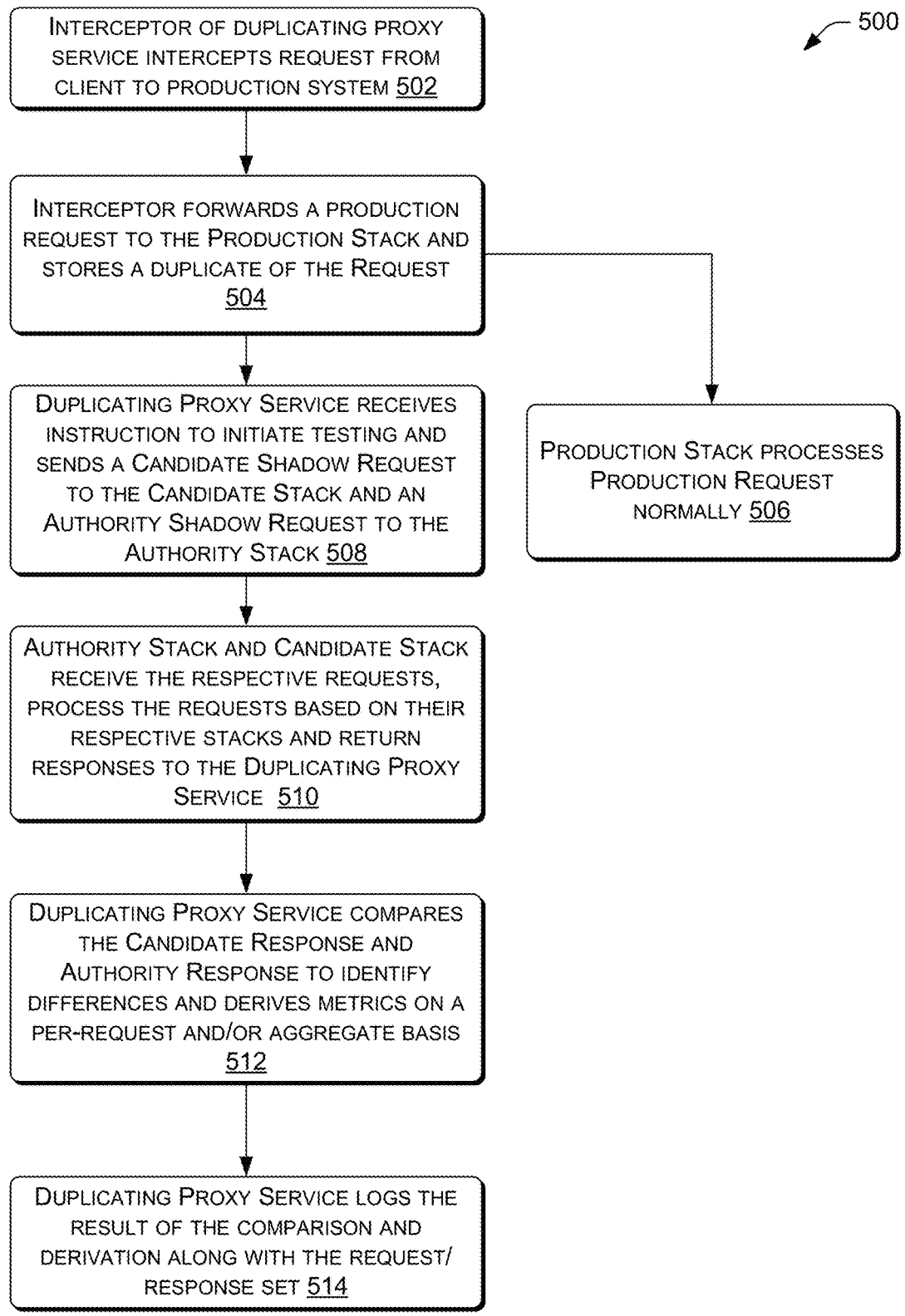
FIG. 5 is a flow diagram of an illustrative process to perform testing of an intercepted request to validate one or more software systems.

FIG. 5 is a flow diagram of an illustrative process 500 that provides an alternative implementation of software testing of one or more software systems in an off-line manner as described above regarding FIGS. 1-3 and may be performed by the duplicating proxy service 110 of the production system 106. Of course, the process 500 (and other processes described herein) may be performed in other similar and/or different devices and/or in different environments.

At 502, the interceptor 112 intercepts a client request 120 from the user 102 to the production system 106. At 504, the interceptor 112 forwards a production request 122 to the production stack 108 and stores a duplicate of the client request 120 as an intercepted request 124. At 506, the production stack 108 processes the production request 122 normally such that a production response 126 is sent back to the user device 104 as a client response 128. In the implementation illustrated in FIG. 5, the interceptor may optionally intercept and store the production response as an intercepted response 130.

At 508, the duplicating proxy service 110 receives an instruction to initiate offline testing and, based on the instruction, sends at least some of the intercepted requests 124 to the candidate stack 114 and authority stack 116 for processing as the candidate shadow requests 132 and authority shadow requests 134.

At 510, the candidate stack 114 and authority stack 116 receive the candidate shadow requests 132 and authority shadow requests 134, respectively. Then, the candidate stack 114 and authority stack 116 process the requests based on their respective software systems and return candidate responses 136 and authority responses 138 to the duplicating proxy service 110, respectively. As stated above regarding FIG. 1, in some implementations, the functions of the authority stack 116 may be fulfilled by the production system 106 and, more particularly, the software system operated by the production stack 108. Also, in some implementations, the candidate stack 114 and authority stack 116 may need to interact with devices outside of the duplicating proxy service system, such as the production stack 108 or other production systems, in order to process the candidate shadow requests 132 and authority shadow requests 134. In such cases, the interactions with the outside devices may be marked as testing interactions to prevent the outside devices operating on the testing interactions as if the testing interactions were production interactions that modify the production system state and/or data. For example, in the case of "stateful" transactions, some implementations may support a way to store stateful data (e.g., transaction data), as "candidate transaction data" which will be ignored by production systems. The candidate transaction data will be written by the candidate stack 114, and the duplicating proxy service 110 loads the testing transaction data and compares it to "production transaction data" or "authority transaction data" after processing each request. Depending on the details of the implementation, "authority transaction data" may also be marked in a similar manner to "candidate transaction data."

Other implementations may provide support for stateless testing for transaction-based (i.e., stateful) services. That is, such implementations may provide hooks in the software system of the candidate stack 114 to avoid the side effect of storing data in a persistent data store. This may allow requests to be sent to the candidate stack without resulting in storage of transactional data.

At 512, the duplicating proxy service 110 compares the candidate response 136 with the authority response 138 to identify differences there between. The duplicating proxy service 110 also analyzes the responses and, based on one or more candidate/authority response pairs, derives metrics for the intercepted requests 124 on both a request by request basis and an aggregate basis.

At 514, the duplicating proxy service 110 may log the results of the comparison and derivation analysis with the request and response set. The duplicating proxy service 110 may store the logged information in a variety of ways.

In some implementations, the logged intercepted requests and associated information may be stored in a searchable catalog organized in a hierarchical manner. For example, the following might be paths in the hierarchy:

NA→US→Company the retailer→digital items→address is in New York
NA→US→Company the retailer→movies→address is in California
NA→US→third party sellers→books→address is in Michigan
NA→CA→third party sellers→books→address is in Ontario
EU→UK→Company the retailer→music items→address is in London
EU→DE→Company the retailer→music items→address is in Berlin For each node in the hierarchy, the duplicating proxy service 110 may provide support to replay all or a subset of the intercepted requests under that node.

In some implementations, the stored logs provide support for an additional type of testing not explicitly mentioned above. In particular, using the stored logs including stored requests and responses, the duplicating proxy service 110 may also provide support for regression testing. In other words, the duplicating proxy service 110 may be capable of running a full regression suite from a node in the request/response catalog against a candidate software system by replaying the stored requests and comparing the candidate responses against the stored responses. This way, a new candidate software system may be thoroughly regression tested using a large number of "realistic" production requests (as much as hundreds of thousands, millions or more). Such testing is based on the principle that the behavior in production is presumed to be correct and therefore the stored responses can be used to qualify new candidate software systems, for example, prior to the testing described above with respect to FIGS. 3-5.

Another storage option is to create an index where each intercepted request is labeled with a unique ID. Such an index may resemble the following:
Company SOR ID: request_01, request_02, . . . .
E-Book Item: request_04, request_02, . . . .
US Order International ship address: request_04

This second option allows for a single request to be mapped to multiple scenarios. To express the hierarchical paths in such an index, the duplicating proxy service 110 could use set intersection. The generation of the request repository and generation of the meta-data index may be automated and regenerated from production requests. In some implementations, the repository generation process may continue until a specified index is "complete," meaning each entry in the index maps to at least one request or even that specific combinations of indexes exist, e.g. Non-Company SOR AND E-book. Such an index may provide for very specific use cases to be regression tested with limited numbers of other use cases being exercised. By utilizing this or another indexing scheme, some implementations may provide indexing based on the code coverage or use cases represented by the indexed requests. Thus, in some implementations, rather than testing one hundred thousand to ten million requests and relying on the assumption that the large number of previously tested requests provide the coverage needed, a smaller number of requests may be tested with a higher degree of certainty that the coverage is provided. Further, when a regression test fails, a user may immediately know what use case failed. In some implementations, if the user knows the behavior of the software is going to change between the authority or production software system and the candidate software system, the user may be able to exempt use cases based on the meta-data affected by the behavior change. In addition or alternatively, some implementations may index the requests based on other criteria such as differences in requests/response pairs, latency differences, processing differences, etc. As such, the additional or alternative indexes may be utilized to provide requests that reflect such criteria.

Figure 6:
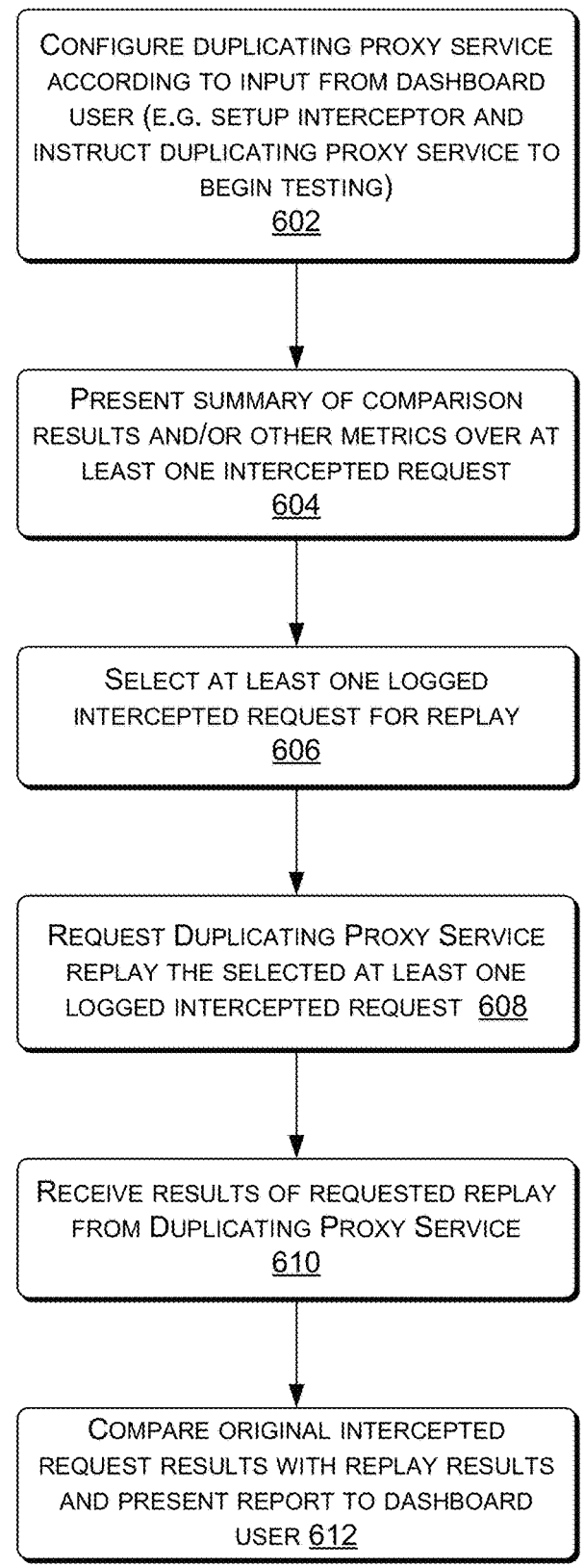
FIG. 6 is a flow diagram of an illustrative process to perform a replay of at least one the intercepted requests to test one or more software systems.

FIG. 6 is a flow diagram of an illustrative process 600 that provides for software testing of one or more software systems using intercepted requests as described above regarding FIGS. 1-3 and may be performed by the dashboard service 118. In particular, process 600 illustrates an example process flow showing the operations of the dashboard service 118, from initiating testing to using replay results to determine if a new candidate software system resolves unacceptable differences identified in a previous candidate software system (e.g. the candidate software system at the initiation of the process 600). It should be noted that there is no requirement of a new candidate software system. This is merely an example scenario used to aid in comprehension.

At 602, the dashboard service 118 configures the duplicating proxy service 110 according to input from a dashboard user. Once the duplicating proxy service 110 is configured, the dashboard service 118 instructs the duplicating proxy service 110 to begin testing. Although, direct communication with the interceptor 112 by the dashboard service 118 is implied in this discussion, such is not always the case as the duplicating proxy service 110 may handle the configuration and instruction of the interceptor 112 based on its own instructions from the dashboard service 118. Moreover, it should be noted that with regard to the control of the duplicating proxy service 110 by the dashboard service 118, this is merely an example implementation. The dashboard service 118 is not required for the operation of the duplicating proxy service 110 in all implementations. In other words, the duplicating proxy service 110 may operate independently or exclusive of the dashboard service 118. For example, the duplicating proxy service 110 may include logic or instructions to determine the configuration without input from the dashboard service 118. Alternatively, the duplicating proxy service 110 may have an internal means by which users or other applications may configure its settings. In still further implementations, the duplicating proxy service 110 and the dashboard service 118 of the duplicating proxy service system may be merged into a single device or application; or the various parts, modules, or the operations performed by the duplicating proxy service 110 and the dashboard service 118 may be reorganized amongst them. For example, the metrics module may be a component of the dashboard service 118 rather than the duplicating proxy service 110.

At 604, the dashboard service 118 presents a summary of the results of a comparison of a pair including a candidate response 136 and a corresponding authority response 138 or intercepted response 130, aggregate information over a plurality of comparisons of candidate responses 136 and corresponding authority responses 138 and/or intercepted responses 130 and/or other metrics for at least one intercepted request 124. The dashboard service 118 may further provide built-in alarming for notifying dashboard users or other appropriate parties, such as the owners of the software system being tested, of deviation from expected results.

At 606, the dashboard service controller or user selects at least one logged intercepted request for replay. Depending on the users' intent, the dashboard service 118 may provide the user with options to select the fields of the response structure to make the comparison on as well as which fields to include in the request log report. For example, in some cases, the dashboard user knows that some fields will be changed due to a change in function or the fields may be randomly generated. In such a case, the user may wish to have one or more such fields excluded from the analysis (by not being analyzed or by continuing to analyze and store information about the field but excluding the field from reporting). Moreover, in some implementations, the dashboard service 118 may provide the user with an interface to select or exclude fields of the requests and/or responses to be tested as the requests are being replayed. For example, if, after initiating an extensive testing process, the user finds that a field or portion of the requests and/or responses to be tested is the subject of multiple differences in the reports of the ongoing testing and that the differences are due to the field or portion being randomly generated, the user may be provided with a control to ignore the field or portion in further reports. Such functionality may be useful where restarting the testing process based on additional exclusions is disadvantageous. Similar functionality may be provided to allow the user to select a field whose differences were previously hidden and indicate that in ongoing reports the differences for the field should be shown or reported (e.g., the user determines that the exclusion of the field from the report was accidental or in error).

At 608, the dashboard service 118 requests the duplicating proxy service 110 replay the selected at least one logged intercepted request in the manner specified. At 610, the dashboard service 118 receives the results of the requested replay from the duplicating proxy service 110. At 612, the dashboard service 118 compares the results for the corresponding intercepted response or prior candidate response from the candidate stack 114 with the results of the replay and presents a report to dashboard user based thereon. For example, in a situation in which the intercepted requests that were selected for replay were intercepted requests corresponding to candidate responses 136 that differed unacceptably from the corresponding authority/production responses 138/124 and a "fix" has since been applied to the candidate software system of the candidate stack 114, the report regarding the replay presented to the user by the dashboard service 118 may indicate to what extent, if any, the unacceptable differences have been reduced.

Diverse System Duplicating Proxy Service System

Figure 7:
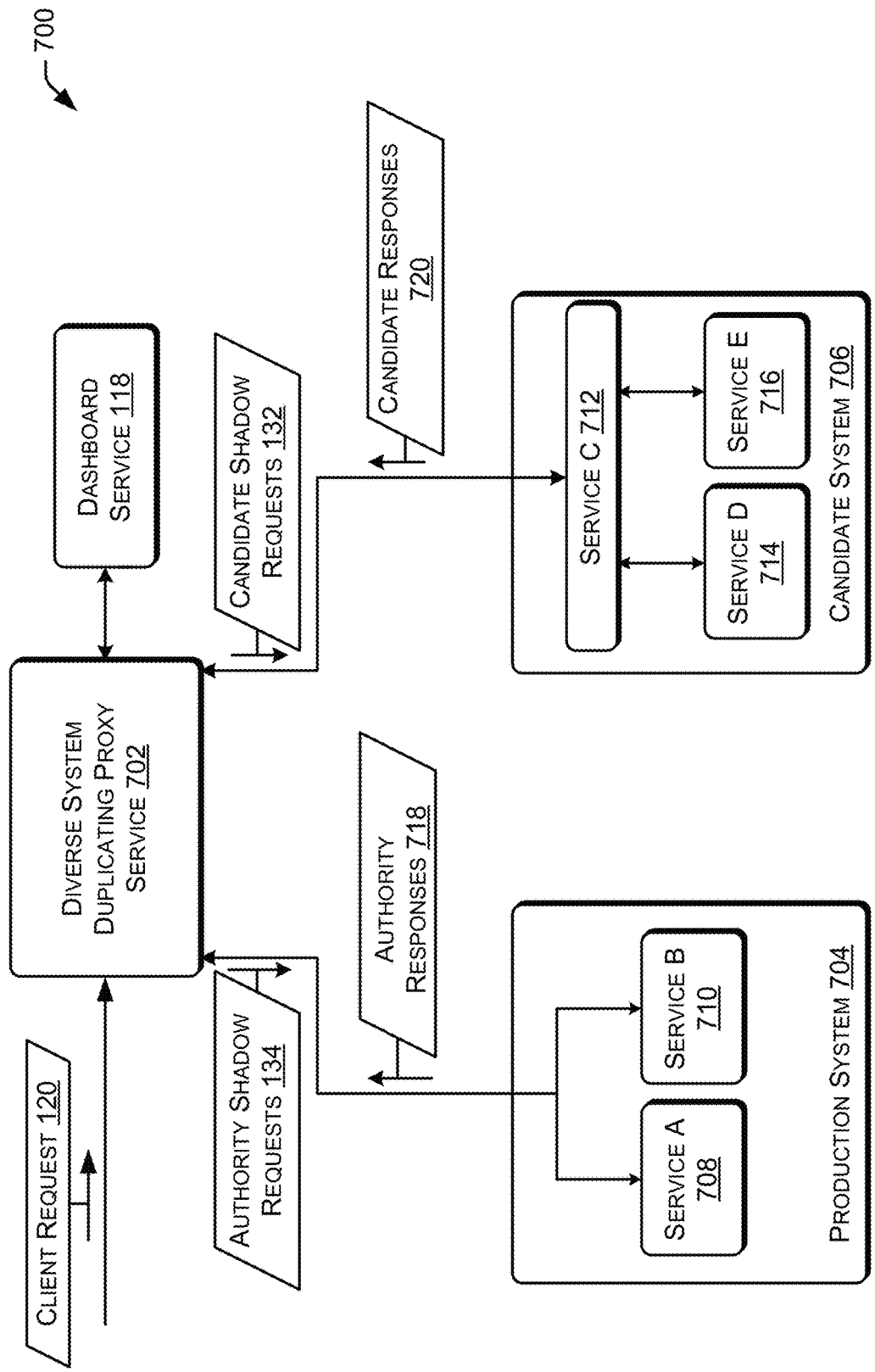
FIG. 7 is a schematic diagram of an illustrative environment that provides for diverse software system testing using intercepted requests.

FIG. 7 is a schematic diagram of an illustrative environment 700 that provides for the use of a diverse system duplicating proxy service system including a diverse system duplicating proxy service 702, an authority system (or stack) 704 and a candidate system (or stack) 706. Specifically, a diverse system duplicating proxy service system is another implementation of the duplicating proxy service system discussed above regarding FIG. 1. As mentioned above, in some implementations, the candidate software system operated by the candidate system 706 may be a different software system from that operated by the authority system 704. Some examples of such different software systems that include systems with different interfaces (such as different input parameters), candidate software systems that include a different numbers of services, candidate software systems implemented using a different framework or protocols, candidate software systems that operate in a different operating system or environment, candidate software systems that operate different hosts (such as using different hardware) and so on. FIG. 7 illustrates one such implementation in which the number of services and the interface to the candidate system 706 is different from the authority system 704.

In operation, the diverse system duplicating proxy service 702 functions similarly to the duplicating proxy service 110 to receive and intercept client requests 120 and issue candidate shadow requests 132 and authority shadow requests 134 to candidate system 704 and authority system 706, respectively. Unlike the scenario illustrated in FIG. 1, the diverse system duplicating proxy service 702 in FIG. 7 may compensate for the different structure and interface of the candidate system 706 from the authority system 704. In particular, in the example illustrated in FIG. 7, the diverse system duplicating proxy service 702 operates as a stand-in for (i.e. impersonates) a client or service that interacts with two services of the authority system 704, service A 708 and service B 710. For example, two example scenarios are that the client or service may (1) communicate with service A 708 and service B 710 regarding respective operations or (2) communicate with service A 708 to obtain a first intermediate response and then issue a second request to service B 710 based on the first intermediate response to obtain a final result. As shown in FIG. 7, the candidate system 706 includes a different structure. Specifically, for the candidate system 706, the client or service being impersonated by the diverse system duplicating proxy service 702 interacts with service C 712 directly and service C 712 communicates with service D 714 and service E 716 to obtain similar results to that of the authority system 704. In scenario (1) given above, the service C 712 may receive requests for service D 714 and service E 716 and issue the requests to the appropriate one, thereby reducing the number of services with which the impersonated client or service communicates in the candidate system. In scenario (2), service C 712 may receive the first request from the impersonated client or service and then obtain a first intermediate response from service D 714. Service C 712 may then handle the issuing of a second request to service E 716 based on the first intermediate response and then return the final result to the impersonated client or service.

As mentioned above, the diverse system duplicating proxy service 702 may operate to compensate for the alterations between the first intermediate response system 704 and candidate system 706. Specifically, the diverse system duplicating proxy service 702 may alter the candidate shadow requests 132, and the interactions with the candidate system 706 in general, to compensate for the presence of service C 712 in the candidate system 706.

For example, in some implementations according to example scenario (1), the diverse system duplicating proxy service 702 may operate such that the requests that are sent to separate services A and B when interacting with the authority system 704 are instead sent to a single service of the candidate system 706 for processing (i.e. service C 712). Further, in some such implementations, the diverse system duplicating proxy service 702 may issue the request such that service C 712 may identify the intended target (i.e. service D 714 or service E 716).

In some implementations according to example scenario (2), (where the client of the authority system 704 expects to receive an intermediate response from service A 708 that is utilized to issue a request to service B 710), the diverse system duplicating proxy service 702 may compensate for the lack of intermediate response and modify the candidate shadow request to provide any additional information that would normally be included in the request issued to service B 710. In other words, the request sent to service C 712 includes both the information provided to service A 708 in the initial request as well as information provided to service B 710 in the second request.

Among the many example reasons for conducting testing when such a different candidate system 706 is being introduced are to allow for verification that the candidate system 706 operates in the expected manner and does not introduce additional latency when compared to the authority and/or production software system(s). For example, the inclusion of service C 712 may introduce additional latency with respect to the production system or service C 712 may contain errors that result in different results from that of the production system. The diverse system duplicating proxy service 702 may also determine the cause of differences, for example, when multi-service operations are involved.

The following is an example scenario in which such multi-service operations may occur. As mentioned above, in FIG. 7, the candidate shadow requests 132 are received by service C 712. The service C 712 interacts with the service D 714 to obtain a first intermediate result. The service C 712 then uses the first intermediate result to conduct further interactions with the service E 716 and, as a result, obtains a second intermediate result. The second intermediate result is then used to generate the candidate response 720 by service C 712. Of course, in some implementations, similar processing may occur in authority systems with respect to the authority shadow requests 134, the service A 708, the service B and the diverse system duplicating proxy service 702 to produce the authority responses 718.

If the diverse system duplicating proxy service 702 were only to compare and analyze the candidate responses 720 and the authority responses 718, it may be difficult to determine whether any differences arise from the service C 712, the service D 714 or the service E 716. Accordingly, in some implementation according to FIG. 7, the candidate system 706 returns the intermediate results and final responses generated by its respective services as part of the candidate responses 720. Additionally, the diverse system duplicating proxy service 702 may record the intermediate response received from the service A 708 as well as additional information regarding the authority system's operation.

If the diverse system duplicating proxy service system 702 detects a difference between the candidate response 720 and authority response 718, additional processing may be undertaken with regard to the intermediate results to ascertain the service in which the difference originates. In other words, if the first intermediate result of the interaction between service A and the diverse system duplicating proxy service is the same as the first intermediate result of the interaction of service C 712 and service D 714 in the candidate system 704, but the result of the interaction between the diverse system duplicating proxy service 702 and the service B differs from that of the second intermediate result of the interaction between service C 712 and service E 716 of the candidate system 704, the difference likely originates in the service E 716 or service C's communication interface with service E.

While shown as another implementation of the duplicating proxy service system, the functionality of the diverse system duplicating proxy system 702 may be incorporated into the duplicating proxy service 110. In other words, the duplicating proxy service 110 could provide the functionality of the diverse system duplicating proxy system 702. For example, when testing is performed with candidate systems that operate substantially the same as the production systems, the duplicating proxy service 110 may operate as discussed with regard to FIG. 1. For candidate systems that operate differently from the production system, the duplicating proxy service 110 may function as discussed above with regard to the diverse system duplicating proxy server 702.

In addition, while specific functions of the duplicating proxy service 110 and the diverse system duplicating proxy system 702 are discussed and described herein, these functions are not exhaustive. For example, in some implementations, the duplicating proxy service 110 and the diverse system duplicating proxy system 702 may issue requests to the respective candidate systems for additional or other purposes. More particularly, in some implementations, the duplicating proxy service 110 and the diverse system duplicating proxy system 702 may issue requests to the candidate software system for actual production processing or may issue requests for which a comparison is not performed with respect to responses generated by another software system (e.g., performing failure or volume tolerance testing on the candidate software system).

Embodiments of the disclosure can be described in view of the following clauses:

Clause 1. A duplicating proxy system, comprising:

at least one computing device configured to implement an interceptor service and a duplicating proxy service, wherein the interceptor service is configured to perform an intercept of at least one request to a production system and provide the at least one intercepted request to the duplicating proxy service; and wherein the duplicating proxy service is configured to process the at least one intercepted request by:

causing at least one candidate shadow request to be processed by a candidate system and at least one corresponding production request to be processed by the production system, the candidate system operating a candidate software system being validated and the production system operating a production software system that is used for validating the candidate software system and the at least one candidate shadow request and the at least one corresponding production request being based at least in part on the at least one intercepted request;

receiving, in response to the at least one candidate shadow request, at least one candidate response from the candidate software system and receiving, in response to the at least one production request, at least one production response from the production software system;

sending the at least one production response to at least one respective requester of the corresponding at least one intercepted request; and comparing the at least one candidate response to the at least one production response to obtain a result.

Clause 2. The duplicating proxy system as recited in clause 1, wherein the duplicating proxy service is further configured to determine a latency difference between the candidate software system and the production software system based at least in part on the received at least one candidate response and the at least one production response.

Clause 3. The duplicating proxy system as recited in any one of clauses 1-2, wherein the comparison of the at least one candidate response to the at least one production response by the duplicating proxy service identifies differences specified as being unacceptable to the operation of the candidate software system.

Clause 4. The duplicating proxy system as recited in clause 3, wherein the duplicating proxy service replays the at least one intercepted request to a modified candidate software system and determines if at least one difference specified as being unacceptable to the operation of the candidate software system that occurred in the at least one candidate response occurs in at least one replay candidate response generated by the modified candidate software system.

Clause 5. The duplicating proxy system as recited in any one of clauses 1-4, wherein the production software system modifies system data of a production system and the duplicating proxy service causes the at least one intercepted request to be processed by the candidate software system such that system data of the production system is not modified.

Clause 6. A computer-implemented method comprising:
under control of one or more processors configured with executable instructions, requesting a candidate software system to process at least one candidate request that is based at least in part on at least one intercepted request to a production software system from a requester, the candidate software system being a software system undergoing validation;

requesting the production software system to process the at least one intercepted request, the production software system being a software system that is used for validating the candidate software system;

receiving, in response to the processing of the at least one candidate request, at least one respective candidate response from the candidate software system;

receiving, in response to the processing of the at least one intercepted request, at least one respective production response from the production software system; and generating a validation result based on a comparison between the at least one respective candidate response with the at least one respective production response.

Clause 7. The computer-implemented method as recited in clause 6, further comprising determining at least a latency difference between the candidate software system and the production software system based at least in part on the received at least one respective candidate response and the at least one respective production response.

Clause 8. The computer-implemented method as recited in any one of clauses 6-8, further comprising intercepting the at least one intercepted request.

Clause 9. The computer-implemented method as recited in clause 8, further comprising:

determining at least one use-case of the candidate software system exercised by at least one intercepted request or at least a code coverage of the candidate software system of the at least one intercepted request; and determining a mix of use-cases of the candidate software system exercised by the at least one intercepted request or an aggregate code coverage of the candidate software system of the at least one intercepted request, wherein the intercepting is performed at least until one or more conditions regarding the mix of use-cases of the candidate software system exercised by the at least one intercepted request or the aggregate code coverage of the at least one intercepted request are satisfied.

Clause 10. The computer-implemented method as recited in any one of clauses 6-9, wherein the production software system of the software modifies system data of a production system and the at least one candidate request is processed by the candidate software system such that system data of the production system is not modified.

Clause 11. The computer-implemented method as recited in any one of clauses 6-11, wherein the generating the validation result based on the comparison of the at least one respective candidate response to the at least one respective production response identifies differences specified as being unacceptable to the operation of the candidate software system.

Clause 12. The computer-implemented method as recited in clause 11, further comprising identifying one or more code changes between a current version of the candidate software system and a prior version of the candidate software system that resulted in the identified differences based at least in part on information from a source control system of the candidate software system.

Clause 13. The computer-implemented method as recited in any one of clauses 6-11, wherein the generating the validation result based on the comparison of the at least one candidate response to the at least one respective production response identifies unexpected differences and suppresses expected differences between the at least one respective candidate response and at least one respective production response.

Clause 14. The computer-implemented method as recited in any one of clauses 6-13, wherein a delay occurs between an intercepting of the at least one intercepted request and the requesting the candidate software system to process the at least one candidate request.

Clause 15. The computer-implemented method as recited in any one of clauses 6-14, wherein the candidate software system is a different software system from the production software system.

Clause 16. The computer-implemented method as recited in any one of clauses 6-15, wherein at least one of:

the candidate software system comprises a different interface from that of the production software system;

the candidate software system comprises a different number of services or components from the production software system;

the candidate software system comprises a different framework or a different protocol from that of the production software system; or the candidate software system operates in a different operating system or environment from the production software system.

Clause 17. One or more non-transitory computer-readable storage media storing computer-executable instructions executable in at least one computing device, comprising:

instructions for selecting one or more intercepted requests logged by a duplicating proxy service to be replayed by the duplicating proxy service by reprocessing the one or more selected intercepted request without modifying production system data of a production system, the logged intercepted requests corresponding to one or more respective production requests that are intercepted prior to processing by the production system;

instructions for replaying at least one selected intercepted request to a candidate software system and an authority software system based at least part on the selecting; and instructions for generating performance metrics for the candidate software system, the candidate software system being a test software system, the candidate software system operating without modifying production system data, the performance metrics including at least one metric relating to differences between a candidate response generated by the candidate software system and the authority response generated by an authority software system that is a software system being used for validating the candidate software system, the candidate software system being a different software system from the production software system and the authority software system.

Clause 18. The one or more non-transitory computer-readable media as recited in any one of clause 17, wherein at least one of:

the candidate software system comprises a different interface from that of the production software system or authority software system;

the candidate software system comprises a different number of services or components from the production software system or authority software system;

the candidate software system comprises a different framework or a different protocol from that of the production software system or authority software system; or the candidate software system operates in a different operating system or environment from the production software system or authority software system.

Clause 19. The one or more non-transitory computer-readable media as recited in any one of clauses 17-18, wherein the instructions for selecting perform the selecting based at least in part on at least one of:

a specified type of difference between a candidate response generated by a candidate software system and an authority response generated by an authority software system;

one or more specified use-cases of the candidate software system; or one or more specified code paths of the candidate software system.

Clause 20. The one or more non-transitory computer-readable media as recited in any one of clauses 17-19, further comprising:

instructions for receiving an input of an indication of one or more portions of a response to the candidate requests; and instructions for configuring the duplicating proxy service to compare and analyze the indicated one or more portions of at least one candidate response with at least one respective authority response.

Clause 21. A duplicating proxy system, comprising:

at least one computing device configured to implement a duplicating proxy service and a dashboard service, wherein the duplicating proxy service is configured to process at least one intercepted request to a production system operating a production software system by:

causing at least one candidate request to be processed by a candidate system and at least one of a corresponding production request to be processed by the production system or a corresponding authority request to be processed by an authority system operating an authority software system, the candidate system operating a candidate software system being validated and the production software system or the authority software system being used for validating the candidate software system and the at least one candidate request and the at least one of the corresponding production request or the corresponding authority request being based at least in part on the at least one intercepted request;

receiving, in response to the at least one candidate request, at least one candidate response from the candidate software system and receiving, in response to the at least one of the corresponding production request and the corresponding authority request, at least one of a production response from the production software system or an authority response from the authority software system; and comparing the at least one candidate response to the at least one of the production response or the authority response to obtain a result; and wherein the dashboard service is configured to perform at least a part of a configuration of at least one of the candidate system and the authority system, the configuration including at least one of selecting system resources to be utilized by the at least one of the candidate system or the authority system or selecting a particular software system of a plurality of software systems to be used as at least one of the candidate software system or the authority software system.

Clause 22. The duplicating proxy system of clause 21, wherein the selecting system resources to be utilized by the at least one of the candidate system or the authority system includes an indication related to one or more machines to host the at least one of the candidate software system or the authority software system.

Clause 23. The duplicating proxy system of clause 21 or clause 22, wherein the configuration further includes causing at least part of the selected system resources to be provisioned with the selected one or more particular software systems.

Clause 24. The duplicating proxy system of any one of clauses 21-23, wherein the dashboard service is further configured to:

receive an input of an indication of one or more portions of at least one candidate response to at least one candidate request; and configure the duplicating proxy service to at least one of include or exclude the indicated one or more portions from a report based on comparison and analysis of at least one candidate response with at least one respective authority response.

Clause 25. The duplicating proxy system of any one of clauses 21-25, the configuration further including configuring an interceptor including configuring at least one of a cap on the number of requests that are intercepted per period of time or a cap on the number of requests that are intercepted per a volume of requests.

Clause 26. One or more non-transitory computer-readable storage media storing computer-executable instructions executable in at least one computing device comprising:

instructions for selecting one or more intercepted requests of one or more logged intercepted requests logged by a duplicating proxy service to be replayed by the duplicating proxy service by reprocessing the one or more selected intercepted request without modifying production system data of a production system, the logged intercepted requests corresponding to one or more respective production requests that are intercepted prior to processing by the production system;

instructions for requesting the duplicating proxy service replay at least one selected intercepted request based at least part on the selecting; and instructions for receiving or generating metrics for a candidate software system, the candidate software system being a test software system, the candidate software system operating without modifying the production system data, the metrics including at least one metric relating to differences between a candidate response generated in response to a candidate request by the candidate software system and an authority response generated in response to an authority request by an authority software system that is a software system being used for validating the candidate software system, the candidate request and the authority request being based at least in part on the one or more selected intercepted requests, the candidate software system being a different software system from the production software system and the authority software system.

Clause 27. The one or more non-transitory computer-readable storage media of clause 26, further comprising:

instructions for configuring of at least one of the candidate software system and the authority software system, the configuring including at least one of selecting system resources to be utilized by the at least one of the candidate software system or the authority software system or selecting a particular software system of a plurality of software systems to be used as at least one of the candidate software system or the authority software system.

Clause 28. The one or more non-transitory computer-readable storage media of clause 26, further comprising:

instructions for configuring of at least one of the candidate software system and the authority software system, the configuring including selecting system resources to be utilized by the at least one of the candidate software system and the authority software system and selecting one or more particular software systems of a plurality of software systems to be used as at least one of the candidate software system or the authority software system; and instructions for causing the selected system resources to be at least part of provisioned with the selected one or more particular software systems.

Clause 29. The one or more non-transitory computer-readable storage media of any one of clauses 26-28, further comprising:

instructions for configuring the replay of requests to the candidate system including configuring at least one of a cap on the number of intercepted logged requests that are replayed per period of time or a cap on the number of intercepted logged requests that are replayed per a volume of all requests.

Clause 30. The one or more non-transitory computer-readable storage media of any one of clauses 26-29, wherein the one or more logged intercepted requests are indexed in a catalog based on one or more of:

use cases of the production software system or the authority software represented by the one or more logged intercepted requests; or the code paths of the production software or the authority software system exercised by the one or more logged intercepted requests.

Clause 31. The one or more non-transitory computer-readable storage media of any one of clauses 26-30, further comprising instructions for performing a search of a catalog of logged intercepted requests based on the one or more of the uses cases of the candidate software system represented by the logged intercepted requests or the code paths of the candidate software system exercised by the logged intercepted requests, wherein the selecting is performed based at least in part on a result of the search.

Clause 32. The one or more non-transitory computer-readable media as recited in any one of clauses 26-31, wherein at least one of:

the candidate software system comprises a different interface from that of the production software system or authority software system;

the candidate software system comprises a different number of services or components from the production software system or authority software system;

the candidate software system comprises a different framework or a different protocol from that of the production software system or authority software system; or the candidate software system operates in a different operating system or environment from the production software system or authority software system.

Clause 33. The one or more non-transitory computer-readable media as recited in any one of clauses 26-32, wherein the selecting is based at least in part on at least one of:

a specified type of difference between a candidate response generated by a candidate software system and an authority response generated by an authority software system;

one or more specified use-cases of the candidate software system; or one or more specified code paths of the candidate software system.

Clause 34. The one or more non-transitory computer-readable media as recited in any one of clauses 26-33, further comprising:

instructions for receiving an input of an indication of one or more portions of a response to the candidate requests; and instructions for configuring the duplicating proxy service to include or exclude the indicated one or more portions from a report based on comparison and analysis of at least one candidate response with at least one respective authority response.

Clause 35. One or more non-transitory computer-readable storage media storing computer-executable instructions executable in at least one computing device, comprising:

instructions for receiving configuration parameters for configuring a candidate system;

instructions for configuring the candidate system based on the configuration parameters, the configuring including allocating system resources indicated by the configuration parameters to be utilized by the candidate system to operate a particular software system of a plurality of software systems indicated by the configuration parameters to be used as a candidate software system, the candidate software system being a test software system, the candidate software system operating without modifying production system data; and instructions for requesting a duplicating proxy service replay at least one intercepted request to the candidate system.

Clause 36. The one or more non-transitory computer-readable storage media of clause 35, wherein the instructions for configuring cause at least part of the allocated system resources to be provisioned with the particular software system.

Clause 37. The one or more non-transitory computer-readable media as recited in any one of clauses 35-36, further comprising:

instructions for receiving metrics for the candidate software system including at least one of:
- a metric relating to differences between a candidate response generated by the candidate software system and an authority response generated by an authority software system that is a software system being is used for validating the candidate software system;
- a metric relating to a latency difference between a candidate response generated by the candidate software system and an authority response generated by an authority software system that is a software system being is used for validating the candidate software system; and
- a metric relating to a processing difference between a candidate response generated by the candidate software system and an authority response generated by an authority software system that is a software system being is used for validating the candidate software system.

Clause 38. The one or more non-transitory computer-readable media as recited in any one of clauses 35-37, further comprising:

instructions for performing a search of a catalog of logged intercepted requests, the requesting the duplicating proxy service replay the at least one intercepted request to the candidate system being performed based at least in part on a result of the search.

Clause 39. The one or more non-transitory computer-readable media as recited in clause 38, wherein the logged intercepted requests is indexed in the catalog based on one or more of use cases of a production software system or an authority software represented by the logged intercepted requests or the code paths of a production software system or an authority software exercised by the logged intercepted requests.

Clause 40. The one or more non-transitory computer-readable media as recited in any one of clauses 35-39, further comprising:

instructions for receiving an input of an indication of one or more portions of a response to the candidate requests; and instructions for configuring the duplicating proxy service to include or exclude the indicated one or more portions from a report based on comparison and analysis of at least one candidate response with at least one respective authority response.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed:

1. A duplicating proxy system, comprising:
   at least one computing device configured to implement an interceptor service and a duplicating proxy service,
   the interceptor service to:
      intercept a production request to a production system that is to provide information responsive to the production request;
      duplicate, at least partially, the production request to create a duplicate request;
      provide the production request to the production system; and
      provide the duplicate request to the duplicating proxy service; and
   the duplicating proxy service to:
      cause a candidate shadow request to be processed by a candidate software system, the candidate shadow request based at least in part on the duplicate request and the candidate software system being a modified version of the production system that is to be validated or a replacement for the production system;
      cause an authority shadow request to be processed by an authority software system that is distinct from the production system and the candidate software system, the authority shadow request based at least in part on the duplicate request, wherein the candidate software system is validated by the authority software system based at least in part on a comparison of the candidate software system to the authority software system;
      receive, in response to the candidate shadow request, a candidate response from the candidate software system;
      receive, in response to the authority shadow request, an authority response from the authority software system; and
      compare the candidate response to the authority response to identify differences between the candidate response and the authority response.

2. The duplicating proxy system as recited in claim 1, wherein the duplicating proxy service is further configured to identify a latency difference between the candidate software system and the authority software system based at least in part on the candidate response and the authority response.

3. The duplicating proxy system as recited in claim 1, wherein the duplicating proxy service is further configured to identify at least one difference that is specified as being unacceptable to operation of the candidate software system.

4. The duplicating proxy system as recited in claim 3, wherein the duplicating proxy service is further configured to:
   record the authority shadow request, the candidate shadow request, or both;
   replay at least one of the authority shadow request or the candidate shadow request to a modified candidate software system that generates a replay candidate response; and
   determine that the at least one difference that is specified as being unacceptable to the operation of the candidate software system that occurred in the candidate response occurs in the replay candidate response.

5. The duplicating proxy system as recited in claim 1, wherein a production software system modifies system data of the production system and the duplicating proxy service causes the production request to be processed by the candidate software system such that system data of the production system is not modified.

6. A computer-implemented method comprising:
under control of one or more processors configured with executable instructions,
requesting a candidate software system to process at least one candidate request that is based at least in part on an intercepted request to a production software system from a requester, the candidate software system being a modified version of the production software system that is to be validated or a replacement for the production software system and undergoing validation prior to being placed in production;
requesting an authority software system to process at least one authority request that is based at least in part on the intercepted request, the authority software system being used for validating the candidate software system, wherein the production software system is a live software system that is different than the authority software system and the candidate software system;
receiving, in response to processing of the at least one candidate request, at least one candidate response from the candidate software system;
receiving, in response to processing of the at least one authority request, at least one authority response from the authority software system;
classifying a comparison between the at least one candidate response and the at least one authority response; and
generating a validation result based on the comparison between the at least one candidate response and the at least one authority response.

7. The computer-implemented method as recited in claim 6, further comprising determining a latency difference between the candidate software system and the authority software system based at least in part on the at least one candidate response and the at least one authority response.

8. The computer-implemented method as recited in claim 6, further comprising intercepting the intercepted request.

9. The computer-implemented method as recited in claim 8, further comprising:
determining a mix of use-cases of the candidate software system exercised by the intercepted request or an aggregate code coverage of the candidate software system of the intercepted request, and
wherein the intercepting is performed at least until one or more conditions regarding the mix of use-cases of the candidate software system exercised by the intercepted request or the aggregate code coverage of the intercepted request are satisfied.

10. The computer-implemented method as recited in claim 6, wherein the production software system modifies system data of a production system and the at least one candidate request is processed by the candidate software system such that system data of the production system is not modified.

11. The computer-implemented method as recited in claim 6, wherein the generating the validation result identifies differences specified as being unacceptable to the operation of the candidate software system.

12. The computer-implemented method as recited in claim 11, further comprising identifying one or more code changes between a current version of the candidate software system and a prior version of the candidate software system that resulted in the differences based at least in part on information from a source control system of the candidate software system.

13. The computer-implemented method as recited in claim 6, wherein the generating the validation result identifies unexpected differences and suppresses expected differences between the at least one respective candidate response and at least one respective production response.

14. The computer-implemented method as recited in claim 6, wherein a delay occurs between an intercepting of the at least one intercepted request and the requesting the candidate software system to process the at least one candidate request.

15. The computer-implemented method as recited in claim 6, wherein the candidate software system is a candidate version of the production software system.

16. The computer-implemented method as recited in claim 6, wherein at least one of:
the candidate software system comprises a different interface from that of the production software system;
the candidate software system comprises a different number of services or components from the production software system;
the candidate software system comprises a different framework or a different protocol from that of the production software system; or
the candidate software system operates in a different operating system or environment from the production software system.

17. One or more non-transitory computer-readable storage media storing computer-executable instructions that are executable in at least one computing device to perform operations comprising:
selecting one or more intercepted requests logged by a duplicating proxy service to be replayed by the duplicating proxy service by reprocessing the one or more intercepted requests without modifying production system data of a production system, the one or more intercepted requests corresponding to one or more production requests that are intercepted based, at least in part, on one or more sampling rules prior to processing by the production system;
replaying at least one intercepted request, of the one or more intercepted requests, to a candidate software system and an authority software system based at least part on the selecting; and
generating performance metrics for the candidate software system, the candidate software system being a test software system that is a modified version of the production system that is to be validated or a replacement for the production system, the candidate software system operating without modifying the production system data, the performance metrics including at least one metric relating to differences between a candidate response generated by the candidate software system and an authority response generated by the authority software system that is a software system being used for validating the candidate software system, the candidate software system being a different software system from the production software system and the authority software system.

18. The one or more non-transitory computer-readable media as recited in claim 17, wherein at least one of:
the candidate software system comprises a different interface from that of the production software system or the authority software system;

the candidate software system comprises a different number of services or components from the production software system or the authority software system;

the candidate software system comprises a different framework or a different protocol from that of the production software system or the authority software system; or the candidate software system operates in a different operating system or environment from the production software system or the authority software system.

19. The one or more non-transitory computer-readable media as recited in claim 17, wherein the selecting is based at least in part on at least one of:

a specified type of difference between the candidate response and the authority response;

one or more specified use-cases of the candidate software system; or one or more specified code paths of the candidate software system.

20. The one or more non-transitory computer-readable media as recited in claim 17, the operations further comprising:

receiving an indication of one or more portions of the candidate response; and configuring the duplicating proxy service to compare and analyze the one or more portions of the candidate response with at least one respective authority response.

* * * * *